(12) United States Patent
Neuhaus et al.

(10) Patent No.: US 12,418,217 B2
(45) Date of Patent: Sep. 16, 2025

(54) LINEAR GUIDE SYSTEM

(71) Applicant: Accuride International GmbH, Diez (DE)

(72) Inventors: Christoph Neuhaus, Niederelbert (DE); Christian Satony, Urbar (DE)

(73) Assignee: Accuride International GmbH, Diez (DE)

( * ) Notice: Subject to any disclaimer, the term of this patent is extended or adjusted under 35 U.S.C. 154(b) by 0 days.

(21) Appl. No.: 18/267,998

(22) PCT Filed: Dec. 14, 2021

(86) PCT No.: PCT/EP2021/085601
§ 371 (c)(1),
(2) Date: Jun. 16, 2023

(87) PCT Pub. No.: WO2022/128986
PCT Pub. Date: Jun. 23, 2022

(65) Prior Publication Data
US 2024/0113592 A1    Apr. 4, 2024

(30) Foreign Application Priority Data

Dec. 18, 2020 (EP) .................................. 20215440

(51) Int. Cl.
*F16H 25/20* (2006.01)
*F16D 7/02* (2006.01)
(Continued)

(52) U.S. Cl.
CPC .......... *H02K 7/1085* (2013.01); *F16D 7/021* (2013.01); *F16H 25/20* (2013.01); *H02K 7/06* (2013.01);
(Continued)

(58) Field of Classification Search
CPC ............. F16H 25/20; F16H 2025/2071; F16H 2025/2075; F16D 7/021; H02K 7/06; H02K 7/1085
(Continued)

(56) References Cited

U.S. PATENT DOCUMENTS 5,915,931 A * 6/1999 Lindner ............... H02K 49/106
417/423.12
6,700,264 B2 * 3/2004 Chu ..................... H02K 49/043
310/104

(Continued)

FOREIGN PATENT DOCUMENTS

AT        515555 B1 * 10/2015
DE     2624058 A1 * 12/1977
(Continued)

OTHER PUBLICATIONS

European Search Report for EP Patent Application No. 20215440.7, Issued on May 14, 2021, 8 pages (Original Document Only).
(Continued)

*Primary Examiner* — T. Scott Fix
(74) *Attorney, Agent, or Firm* — MEDLER FERRO WOODHOUSE & MILLS PLLC

(57) ABSTRACT

The present invention relates to a linear guide system having: at least a first rail element and a second rail element, the first rail element and the second rail element being mounted linearly displaceably relative to each other in and counter to a extraction direction; an electric motor; an input shaft, the input shaft being operatively coupled to the electric motor such that the electric motor sets the input shaft in rotation during operation of the linear guide system; a linear drive, the linear drive having an output shaft, and the linear drive being designed such that a rotary movement of the output shaft effects a linear movement of the first and second rail elements relative to each other in or counter to (Continued)

the extraction direction; and a clutch, the clutch connecting the input shaft and the output shaft to each other such that the clutch transmits a torque from the input shaft to the output shaft, the clutch being a magnetic clutch. The magnetic clutch has a first and a second clutch element, the first clutch element being connected in a torque-resistant manner to the input shaft, and the second clutch element being connected in a torque-resistant manner to the output shaft.

11 Claims, 3 Drawing Sheets

(51) Int. Cl.
*H02K 7/06* (2006.01)
*H02K 7/108* (2006.01)
(52) U.S. Cl.
CPC .............. *F16H 2025/2071* (2013.01); *F16H 2025/2075* (2013.01)
(58) Field of Classification Search
USPC ................................ 74/89.38; 310/103, 104
See application file for complete search history.

(56) References Cited

U.S. PATENT DOCUMENTS

| | | | |
|---|---|---|---|
| 10,411,571 B2 * | 9/2019 | Bendixen ............. | F04D 13/025 |
| 2012/0262017 A1 * | 10/2012 | Mengibar Rivas .. | H02K 49/106 |
| | | | 310/103 |
| 2014/0077646 A1 * | 3/2014 | Osterberg ............ | H02K 49/106 |
| | | | 310/104 |

FOREIGN PATENT DOCUMENTS

| | | |
|---|---|---|
| DE | 102004057714 A1 | 6/2006 |
| DE | 202010016153 U1 | 2/2012 |
| DE | 102015211751 A1 | 12/2016 |
| WO | WO-2015197283 A1 * 12/2015 | ........... F04D 13/025 |

OTHER PUBLICATIONS

International Search Report and Written Opinion received for PCT Patent Application No. PCT/EP2021/085601, mailed on Mar. 14, 2022, 17 pages (7 pages of English Translation and 10 pages of Original Document).

* cited by examiner

LINEAR GUIDE SYSTEM

CROSS REFERENCE TO RELATED APPLICATIONS

This application is a National Stage of International Application No. PCT/EP2021/085601 filed Dec. 14, 2021, which claims benefit of European Patent Application No. 20215440.7 filed Dec. 18, 2020, both of which are herein incorporated by reference in their entirety.

The present invention relates to a linear guide system having at least a first rail element and a second rail element, the first rail element and the second rail element being mounted linearly displaceably relative to each another and counter to a extraction direction; an electric motor; an input shaft, the input shaft being operatively coupled to the electric motor such that the electric motor sets the input shaft in rotation during operation of the linear guide system; a linear drive, the linear drive having an output shaft and the linear drive being designed such that a rotary movement of the output shaft effects a linear movement of the first and second rail elements relative to each other in or counter to the extraction direction; and a clutch, the clutch connecting the input shaft and the output shaft to each other such that the clutch transmits a torque from the input shaft to the output shaft.

Linear guide systems, in particular telescopic rails having at least two rail elements and optionally a rolling element cage with rolling elements received therein for reducing the friction between the rail elements are known from the prior art in a wide variety of different embodiments. They are used in various household appliances, but also in automotive manufacturing and in many other applications. A large number of applications already use motor-driven linear guide systems. A shaft-based linear drive is typically used in this context. One such translates rotational movement of a shaft into linear movement of the rail elements relative to each other.

It has become problematic that motor driven linear guide systems require extensive control given obstacles in the extension path of the element being moved by the linear guide system, e.g. a drawer, in order to avoid damage, an overload situation of the drive, or even operator injury. More-over, the torque-resistant connection between the motor shaft of the electric motor and the output shaft of the linear drive is an expensive step during the production of the telescopic rails.

In contrast, the object of the present invention is to provide a linear guide system that at least reduces or avoids the aforementioned disadvantages.

At least one of the aforementioned objects is solved by means of a linear guide system according to the independent claim. According to the present invention, it is thus proposed to design a linear guide system of the aforementioned type such that the clutch is a magnetic clutch. In one embodiment of the invention, the clutch is a magnetic clutch having a first clutch element and a second clutch element, the first clutch element being connected to the input shaft in a torque-resistant manner and the second clutch element being connected to the output shaft in a torque-resistant manner.

The present invention is based on the idea of using a magnetic clutch to transmit torque from the input shaft, which is coupled to the electric motor, in particular to a motor shaft of the electric motor, to the output shaft of the linear drive. Such a magnetic clutch has the advantage that the clutch itself provides overload protection. A magnetic force between the first and the second clutch elements causes a limitation of the torque transmission. If the driven rail element is blocked, for example, then the magnetic clutch slips. The clutch element connected to the input shaft continues to rotate, but it no longer transmits torque to the clutch element connected to the output shaft. The magnetic clutch forms a slip clutch that slips when a certain countertorque of the output shaft is exceeded relative to the torque of the input shaft applied by the electric motor.

This provides overload protection for the driven guide system as well as optional clamping protection.

The magnetic clutch also enables quick assembly during manufacturing. The output shaft of the drive can be preassembled with the corresponding second clutch element, and the input shaft or, if applicable, the motor along with the input shaft, can likewise be preassembled with the first clutch element. In one embodiment, the motor is flange-mounted during assembly, and the two shafts are directly connected to one another when appropriately positioned so that torque can be transmitted between them.

In one embodiment of the invention, the guide system is selected from a group consisting of an extraction guide, a telescopic rail, and a linear guide. The generic term "linear guide system" in-cludes sliding guides, ball guides, and roller guides. When, in the context of the present application, reference is made to a guide system, this term should be generally understood to include not only rails in which the first rail element and the second rail element have approximately the same length, i.e., in particular telescopic rails, but also guides, in particular linear guides, in which the second rail element is significantly shorter than the first rail element or in which the second rail element is formed by a roller carriage.

In the context of the present application, the extraction direction is understood to be the direction in which the first rail element and the second rail element can be moved relative to one another, preferably linearly, in order to move from a retraction position to an extraction position. Accordingly, a direction opposite to the extraction direction is the direction in which the first and second rail elements are moved relative to one another in order to return to the retraction position.

Regarding a telescopic rail, the retraction position is the position of the first and the second rail elements relative to one another, in which the telescopic rail is fully retracted. The extraction position then refers to the position of the first and the second rail element relative to one another, in which the telescopic rail is maximally extended.

When the present application states that the guide system according to the invention has a first rail element and a second rail element, this does not preclude the guide system, in particular if it is a telescopic rail, from having further rail elements, in particular three rail elements, e.g., to provide complete extraction.

In one embodiment of the invention, the first and second rail elements each have two contact surfaces, with rolling elements received in a rolling element cage being arranged on the two contact surfaces of the first rail element and arranged on the two contact surfaces of the second rail element. These rolling elements roll on the respective contact surfaces and reduce friction between the first rail element and the second rail element. A rolling element in the context of the present application is understood to be a rotating element which, as an element of a guide, significantly reduces the friction between the various rail elements and thus facilitates a relative movement of two rail elements with respect to one another. Examples of rolling elements include balls, rollers, barrels, needles, or cones.

In one embodiment of the present invention, the rolling elements are balls. It goes without saying that the rolling element cage in this case is a ball cage.

In one embodiment of the invention, at least the first rail element or the second rail element is made of a material selected from a group consisting of sheet steel, aluminised sheet steel, and stainless steel.

An electric motor in the context of the present invention is a motor having a rotating motor shaft for providing a torque. In one embodiment of the invention, the electric motor is selected from a group consisting of a stepper motor, a brushless DC motor (BLDC), or a brushed DC motor (DC).

In the context of the present invention, the electric motor is operatively coupled to the input shaft. During operation of the linear guide system, the use of said clutch is associated with the motor setting the input shaft into rotary or rotational movement. To provide the required torque clutch between the electric motor and the input shaft, a motor shaft of the electric motor can be coupled to the input shaft via a transmission or clutch. In one embodiment, however, the input shaft is also the motor shaft of the electric motor.

Linear drives in the context of the present invention include shaft-based linear drives in which rotary movement of a shaft, i.e., the output shaft in the context of the present application, is effected during a linear relative movement of the first and second rail elements relative to each other in or counter to the extraction direction. In one embodiment of the invention the linear drive is selected from a group consisting of a belt drive, a rack drive, and a spindle drive. In a belt drive, the output shaft drives a belt gear that drives the belt. In a rack-and-pinion drive, the output shaft drives a gear that runs along the rack. In a stem drive, the output shaft drives a threaded spindle, or it is formed by the threaded spindle.

In the context of the present application, when the shaft of the linear drive is referred to as an "output shaft", this designation is in substantive connection to the clutch according to the invention. Regarding the clutch, there is an input shaft that transmits the torque to the clutch and an output shaft that dissipates the torque from the clutch. This output shaft forms the shaft of the linear drive.

In an embodiment of the invention in which the linear drive is a stem drive, the stem drive has a threaded spindle and a stem nut running on the threaded spindle. The spindle nut is connected to the first or the second rail element so that the spindle nut takes the first or second rail element along given a rotary movement of the threaded spindle. The threaded spindle is fixed with respect to the rail element not connected to the spindle nut. In one embodiment, the output shaft and the threaded spindle are formed from a single component.

In the context of the present invention, when it is stated that two elements connected to each other in a torque-resistant manner, this means a connection in which one torque is transferable from one element to the other without loss or slippage, as long as the elements are not impaired in function or destroyed. Therefore, the first clutch element is connected to the input shaft in a torque-resistant manner. As long as the first clutch element and the input shaft are not destroyed, rotary movement of the input shaft effects rotary movement of the first clutch element at the same angular speed and no torque loss. Likewise, the second clutch element is connected to the output shaft in a torque-resistant manner. Rotary movement of the second clutch element effects a rotary movement of the output shaft at the same angular speed without slippage and without torque loss.

In one embodiment of the invention, at least the first clutch element or the second clutch element has a permanent magnet. In one embodiment, permanent magnets are provided on both the first clutch element and the second clutch element. While permanent magnets are the first choice for many applications due to their design and low cost, the present invention does not exclude, e.g., the use of an electromagnet for the clutch.

In one embodiment, it is possible to design the magnetic clutch according to the invention such that the first clutch element and the second clutch element always have sufficient distance from one another during operation of the telescopic rail, so that they are not mechanically engaged or con-tacted with one another. In such an implementation, a spacing gap is provided between the first clutch element and the second clutch element. In such an embodiment, torque transmission from the first clutch element to the second clutch element occurs exclusively via the magnetic forces acting between the clutch elements. It is understood that, in such an embodiment, preferably the first clutch element and the second clutch element have a plurality of permanent magnets, the poles of which are designed and arranged to ensure torque transmission between the first and second clutch elements solely due to the acting magnetic force.

However, in one embodiment the first clutch element and the second clutch element have a frictional fit with each other due to the magnetic force exerted by a magnet. A magnetic attracting force acting in the axial direction between the first clutch element and the second clutch element provides a frictional fit, in particular a frictional fit between the two clutch elements.

In one embodiment, a maximum torque transmitted from the motor shaft to the input shaft without slippage of the clutch by means of the frictional fit between the two clutch elements provided due to the magnetic force is transmitted between the two clutch elements in a straightforward manner. If the torque of the motor shaft exceeds the maximum torque defined in this way, then clutch will slip. In the case of magnetic clutches comprising gap, as described in the introduction, however, the definition of the counter torque requires a more complex design and calculation.

In one embodiment, the first clutch element and the second clutch element have a frictional fit only when engaged with each other. In such an embodiment, there is no positive fit between the first and second clutch elements which would transmit a torque from the motor shaft to the input shaft.

However, embodiments are conceivable in which the clutch elements have a frictional and positive fit with each other, so that both a frictional fit and a positive fit are used for torque transmission. Even in such an embodiment, slippage of the clutch can be ensured when a maximum torque is exceeded by a suitable design for the positive fit.

In one embodiment of the invention, the frictional fit between the first clutch element and the second clutch element is provided by two frictional surfaces mechanically engaged with each other. To this end, in one embodiment of the invention, the first clutch element has a first friction surface, and the second clutch element has a second friction surface. In one embodiment, the first friction surface is perpendicular to the motor shaft, and the second friction surface is perpendicular to the input shaft. The first friction surface and the second friction surface are engaged with each other so that the torque is transmitted from the motor shaft to the input shaft from the motor shaft by a frictional fit, preferably only by a frictional fit, between the first friction surface and the second friction surface.

In an embodiment of the invention in which only the first clutch element or the second clutch element has a magnet, this clutch element in the context of the present application is also referred to as a magnetic starter disc, and the other clutch element in the context of the present application is also referred to as a starter disc. In an embodiment having a frictional fit between the first and second clutch elements, the maximum torque transmitted without slippage of the clutch can be determined by simple measures during the design of the magnetic clutch. In addition to the magnetic force provided by the at least one magnet in the axial direction, the design of the tribological system consisting of the first clutch element and the second clutch element have an impact on the maximum torque transmitted without slippage. Friction between the first clutch element is determined in particular by an expansion of the first and second friction surfaces, a surface quality (i.e., roughness), the first and second friction surfaces, and the material of the friction surfaces.

In an embodiment of the invention in which at least the first clutch element or the second clutch element has a permanent magnet, this permanent magnet is arranged in a pot made of a ferromagnetic material. Such a pot serves to concentrate the magnetic field lines of the permanent magnet and thus increase the holding force exerted in the axial direction on the opposite clutch element.

In one embodiment of the invention, the pot has a base facing the respective shaft and substantially cylindrical side walls. On the side facing away from the shaft, the pot is open and the side walls have a protrusion opposite a surface of the magnet. Only the side walls of the pot in which the magnetic field lines concentrate then come into frictional engagement with the opposite clutch element, in particular the thrust washer. In this embodiment, the two frictional friction surfaces engaged with each other are each annular.

In one embodiment of the invention, the material of the pot is selected so that the magnetic force is optimised in the axial direction.

In one embodiment of the invention, only the first clutch element or the second clutch element has a permanent magnet, the permanent magnet being arranged such that portions of the permanent magnet are enclosed in ferromagnetic material of the first clutch element, and portions of the permanent magnet are enclosed in ferromagnetic material of the second clutch element, preferably completely enclosed. Such an embodiment is achieved by, e.g., the permanent magnet being inset in a canister having a base, while the open side of the canister is connected by a surface of the clutch element arranged opposite.

In one embodiment of the invention, the first clutch element has a first centring portion, and the second clutch element has a second centring portion, the first and second centring portions being designed to be complementary to each other, and the first and second centring portions being designed such that they guide the first clutch element and the second clutch element in the radial direction relative to each other, and such that the first clutch element and the second clutch element have a common axis of rotation.

Such a design serves to centre the clutch elements such that the axes of rotation and the clutch elements coincide. The centring portions serve in this case to guide in the radial direction without affecting torque transmission.

In one embodiment of the invention, the first and second centring portions are therefore designed to enable rotary movement of the first clutch element at a first angular speed and rotary movement of the second clutch element at a second angular speed, the first angular speed being different from the second angular speed.

In one embodiment of the invention, one of the first and second centring portions has a centring bushing, and the other of the first and second centring portions has a centring pin, with at least portions of the centring pin extending into the centring bushing. It is understood that, in one embodiment of the invention, the centring pin and the centring bushing form a clearance fit in the radial direction. The centring pin and the centring bushing therefore do not affect the maximum torque transmitted without slippage of the clutch.

In one embodiment of the invention, at least the centring bushing or the centring pin has a cross-section, at least portions of which taper. An improved centring effect can in this way be achieved. It is understood that the centring bushing tapers toward the shaft via which the clutch element is connected to the centring bushing in a torque-resistant manner. In contrast, the centring pin tapers in a direction away from the shaft via which the clutch element is connected to the centring pin in a torque-resistant manner.

In an embodiment of the invention, the first or second clutch element has an annular permanent magnet, the centring pin engaging a centring bushing surrounded by the annular permanent magnet or engaging a centring bushing formed by the annular permanent magnet. Such a design re-sults in a strong axial holding force between the two clutch elements.

In the context of the present invention, the axial direction and thus the term "axial" also refers to a direction parallel to an axis of rotation of at least the motor shaft or the input shaft. In one embodiment of the invention, the axial direction coincides with the extraction direction. Accordingly, a radial direction refers to a direction that is perpendicular to the axial direction and thus the axis of rotation of at least one of the shafts and intersects that axis of rotation.

In one embodiment of the invention, at least the first clutch element or the second clutch element is clamped onto the motor shaft or the input shaft such that torque is transmittable by a frictional joint between the respective clutch element and the respective shaft, in which case a torque-resistant connection is formed between the respective clutch element and the respective shaft. Such clamping of the clutch elements onto the respective shaft enables simple assembly of the telescopic rail. The clamping process can in this case be performed by pressing, but also by means of an additional fastening means, e.g., by screwing a set screw into a sleeve, so that the set screw is engaged with the respective shaft.

In one embodiment of the invention, at least the first clutch element or the second clutch element has an axially extending assembly sleeve, the motor shaft or the input shaft extending into the assembly sleeve and the motor shaft or the input shaft being connected to the assembly sleeve at least with a frictional fit, a positive fit, or a bonded fit. In one embodiment of the invention, the assembly sleeve is pinched onto the respective shaft.

In another embodiment, in an assembled state, the motor shaft or input shaft has an interference in the radial direction opposite the respective assembly sleeve. Such an interference can already be present before the respective shaft is inserted into the assembly sleeve. However, the interference can also be generated by the assembly sleeve being pressed, crushed, or thermally shrunk after insertion of the shaft into the assembly sleeve.

Further advantages, features, and possible applications of the present invention will become apparent from the description of embodiments hereinafter and the associated figures. In the figures, like elements are identified using like reference numbers.

Figure 1:
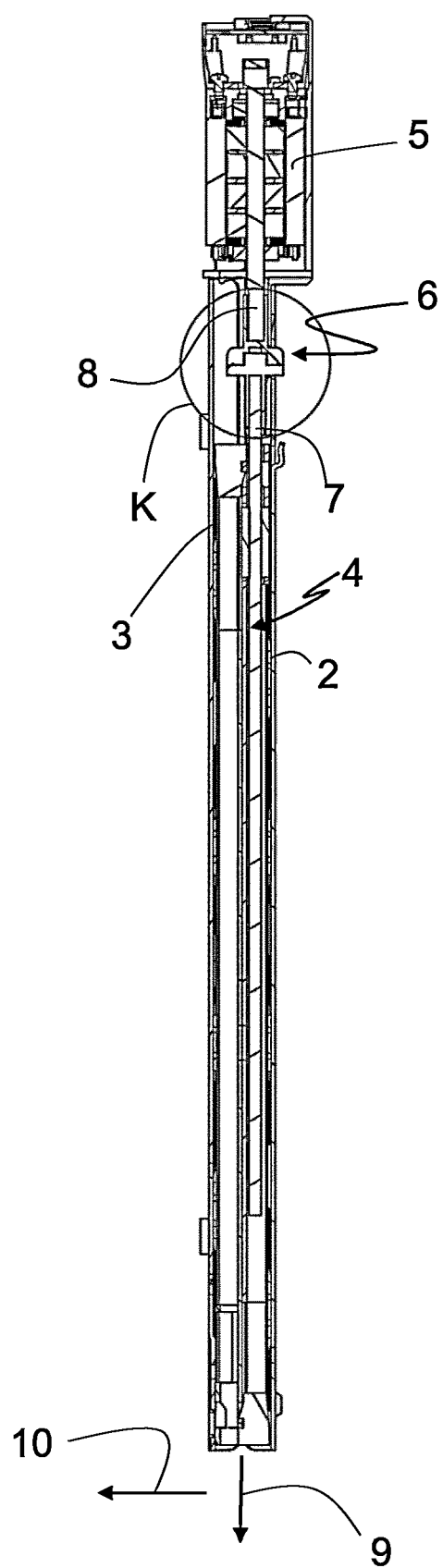
FIG. 1 is a schematic lateral view of a telescopic rail according to one embodiment of the present invention.

In the embodiment described in the following examples, the linear guide system is a telescopic rail 1, as shown in FIG. 1. The telescopic rail 1 shown in FIG. 1 is a detail having a first outer rail element 2 and a second inner rail element 3. The rail elements are conventional rail elements, each with a rail rear and two contact surfaces extending from the rail rear. Arranged between the contact surfaces of the two rail elements 2, 3, are rolling elements, which roll along the contact surfaces, so that friction is reduced when the two rail elements 2, 3 slide against each other.

In addition to the two rail elements 2, 3, the telescopic rail 1 has a linear drive in the form of a spindle drive 4, an electric motor 5, and a clutch 6.

The spindle drive 4 consists of a threaded spindle 7 as an output shaft in the context of the present application and a spindle nut rotatable relative to the threaded spindle 7 on the supported spindle nut. The spindle nut (not shown in FIG. 1) is connected to the inner rail element 3. The threaded spindle 7 is supported in a stationary but rotatable direction on the outer rail element 2 in the axial direction. Thus, rotary movement of the threaded spindle 7 effects linear movement of the spindle nut and thus the inner rail element 3.

The direction in which the second rail element 3 is pushed out of the first rail element 2 refers to the extension direction. This direction is provided with reference number 9 in FIG. 1. The extraction direction 9 coincides with the axis of rotation of the threaded spindle 7 and a motor shaft 8 of the electric motor 5. The extraction direction 9 is therefore also referred to as the axial direction. Directions perpendicular to and intersecting the axis of rotation of the threaded spindle 7 and the motor shaft 8 are referred to as radial directions.

The electric motor 5 has a motor shaft 8, which rotates during operation of the telescopic rail 1 driven by the electrodynamic forces of the motor. This motor shaft 8 forms the input shaft within the context of the present application. The torque generated by the electric motor 5 and introduced into the motor shaft 8 is transmitted from the motor shaft 8 to the threaded spindle 7 using the magnetic clutch 6.

Figure 2:
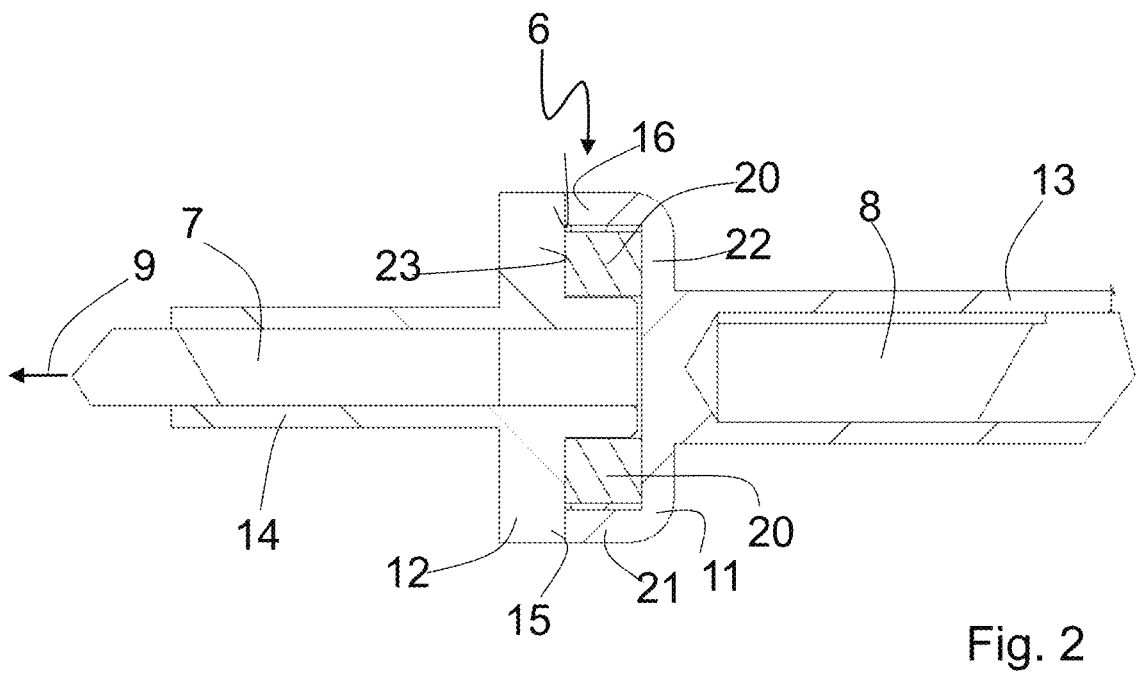
FIG. 2 is an enlarged cross-sectional view of an embodiment of the magnetic clutch of the telescopic rail shown in FIG. 1.
Figure 3:
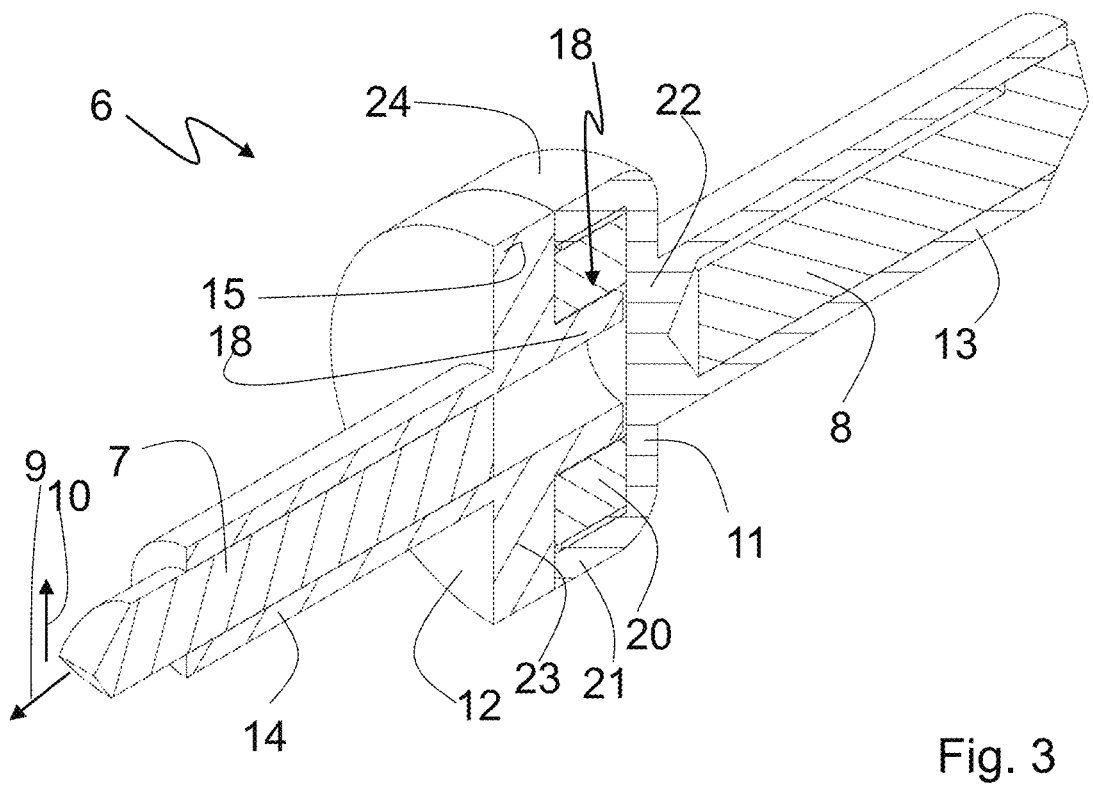
FIG. 3 is a partially exposed isometric view of the magnetic clutch shown in FIG. 2.
Figure 4:
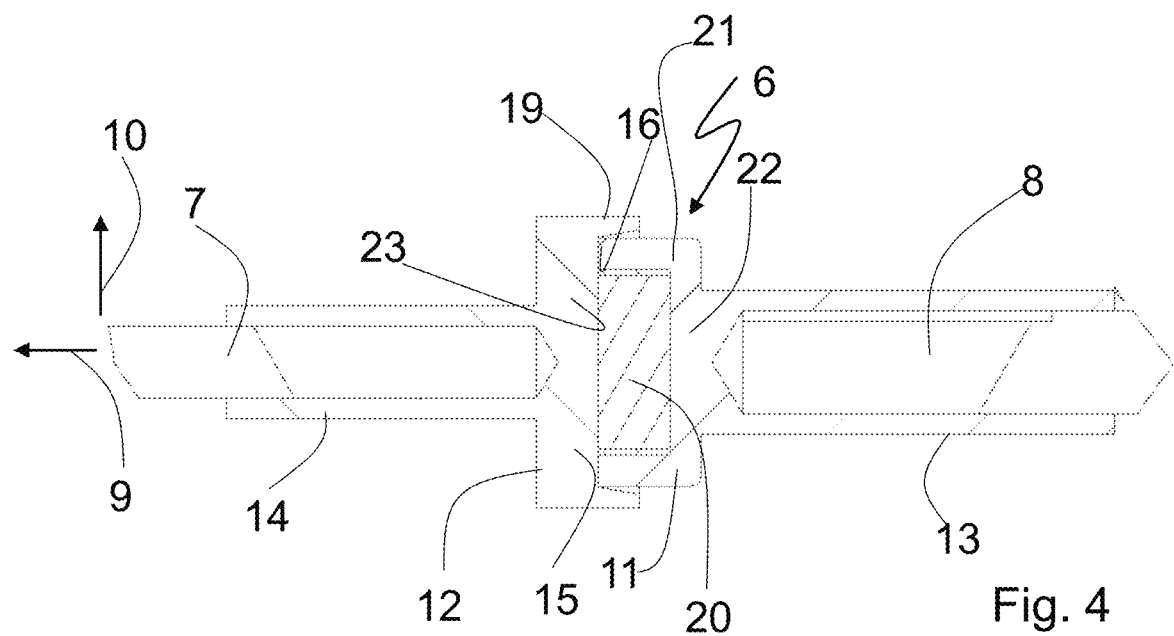
FIG. 4 is an enlarged cross-sectional view of another embodiment of the magnetic clutch of the telescopic rail shown in FIG. 1.

The magnetic clutch 6 will now be described in more detail on the basis of two embodiments thereof. These two embodiments are shown enlarged in FIGS. 2 to 4. FIGS. 2 and 3 in this case show a first embodiment, and FIGS. 3 and 4 show a second embodiment. The illustrations are taken from the circle K shown in FIG. 1.

Each of the magnetic clutches 6 of the embodiments shown in FIGS. 2 to 4 has a respective first clutch element 11 and a second clutch element 12.

The first clutch element 11 is the clutch element on the motor shaft side. This first clutch element 11 is connected to the motor shaft 8 in a torque-resistant manner. In other words, a torque of the motor shaft 8 is introduced from the motor shaft 8 into the first clutch element 11 without slip and torque loss. The motor shaft 8 and the first clutch element 11 always rotate at the same angular velocity. The second clutch element 12 is in turn connected to the threaded spindle 7 in a torque-resistant manner, so that a torque transmitted to the second clutch element 12 is transmitted to the threaded spindle 7 in full and without slip. The threaded spindle 7 and the second clutch element 12 always rotate at the same angular velocity.

The clutch elements 11, 12 each have an assembly sleeve 13, 14 for the torque-resistant connec-tions between the first clutch element 11 and the motor shaft 8 and between the second clutch element 12 and the threaded spindle 7. The assembly sleeves 13, 14 are hollow cylindrical so that the respective shaft 7, 8 is inserted into this sleeve 13, 14. After insertion, the sleeves 13, 14 are pressed inwardly in a linear direction such that the sleeves 13, 14 have a frictional and torque-resistant fit on the respective shaft 7, 8. In this way, a simple assembly of the two clutch elements 11, 12 on the respective shaft 7, 8 is ensured.

In the embodiment shown in FIGS. 2 and 3, the assembly sleeve 13 of the first clutch element 11 is designed as a blind bore with a sleeve base. In contrast, the assembly sleeve 14 of the second clutch element 12 has a through-passage that is easier to manufacture.

The two embodiments of the magnetic clutch 6 have in common that the two clutch elements 11, 12 have a frictional fit with each other in the axial direction. The force acting in the axial direction and producing the friction fit is a magnetic force from a permanent magnet 20. In the illustrated embodiment, each of the first motor-end clutch elements has a permanent magnet 20 that attracts the second spindle-end clutch element 12. Therefore, the first clutch element 11 is also referred to as a pot magnet, and the second clutch element 12 is referred to as a magnetic thrust ring.

Each of the two clutch elements 11, 12 has a friction surface. The first friction surface of the first clutch element 11 is provided with reference number 15 in the drawings. The second friction surface 16 of the second clutch element 12 is in flat contact with the first friction surface 15. Thus, the maximum torque transmitted from the first clutch element 11 to the second clutch element 12 without slippage of the clutch 6 is determined not only by the magnetic force of the permanent magnet 20, but also by the surface of the two friction surfaces 15, 16, their surface quality, (i.e., roughness), and the material of the friction surfaces.

The friction surfaces 15, 16 of the magnetic clutch 6 of the embodiment shown in FIGS. 2 and 3 are annular in shape. The permanent magnet 20 of the first clutch element 11 of the embodiment shown in FIGS. 2 and 3 is an annular magnet. This magnet 20 is glued into a pot 21 made of ferromagnetic steel. The pot 21 has a base 22 on its motor shaft-facing side and is open on the side facing the second clutch element 12. The sidewall 24 of the pot sits on the side facing the second clutch element 12 opposite a surface 23 of the magnet 20. As a result, only the end face of the side wall 24 projecting over the surface 23 of the magnet 20 has a frictional fit with the second clutch element 12. This end face of the side wall 24 of the pot 21 thus forms the first friction surface 15 of the first clutch element 11.

In contrast, the two friction surfaces 15, 16 in the embodiments shown in FIGS. 3 and 4 are circular surfaces. The surface 23 of the magnet 20 and the end face of the side wall of the pot are flush with the surface. The magnet 20 of the clutch 6 in FIGS. 3 and 4 is a circular disc magnet.

Figure 5:
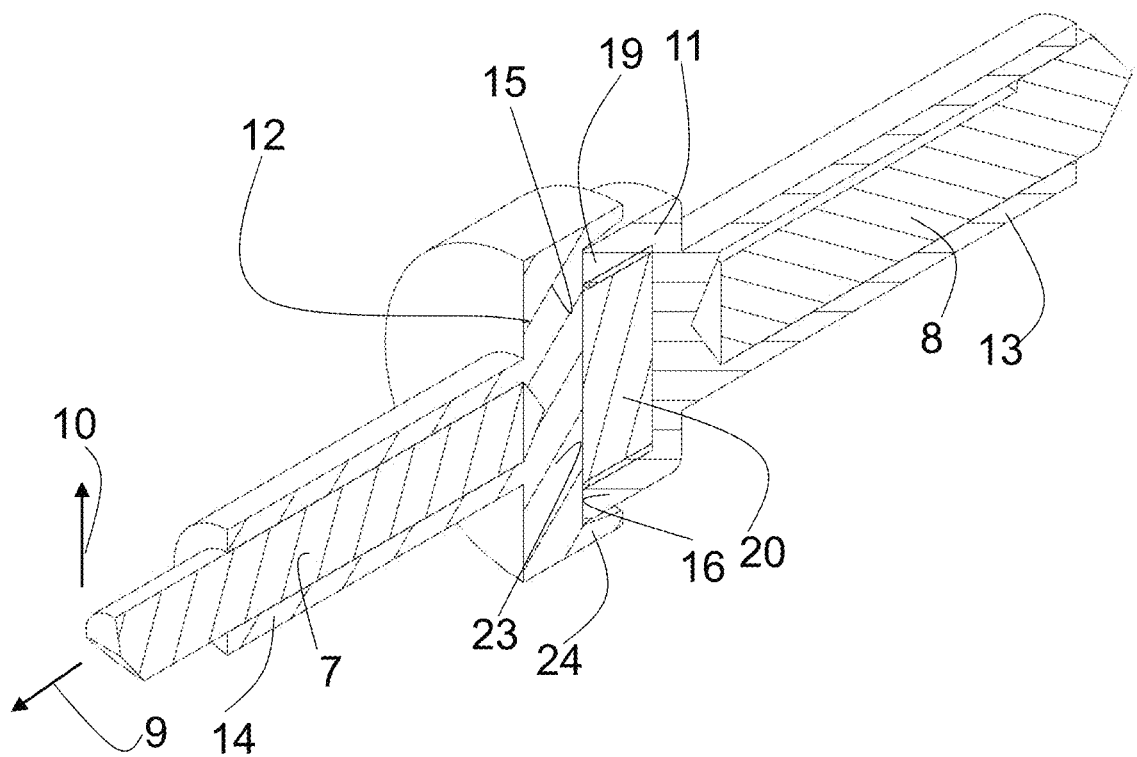
FIG. 5 is a partially exposed isometric view of the magnetic clutch shown in FIG. 4.

The embodiment shown in FIGS. 2 and 3 on the one hand and the embodiment shown in FIGS. 4 and 5 on the other hand also differ with respect to the centring of the two clutch elements 11, 12 with respect to each other.

Each of the clutch elements 11, 12 has a centring portion. In the embodiment shown in FIGS. 2 and 3, the first centring portion of the first clutch element 11 is a centring bushing 17, into which a centring pin 18 extends as a centring portion of the second clutch element 12. The centring bushing 17 is formed by cylindrical inner wall surfaces of the ring magnets 20, while the centring pin 18 has cylindrical outer wall surfaces. The outer wall surfaces of the centring pin 18 and the inner wall surfaces of the centring bushing 17 together form a clearance fit, so that the centring pin 18 is freely rotatable in the centring bushing 17, but a relative movement in the radial direction 10 is only possible within the limited clearance provided.

In the embodiment shown in FIGS. 4 and 5, the second, spindle-driven clutch element 12 is designed in a pot-shaped manner so that the hollow cylindrical wall 19 of the pot receives a centring portion of the cylindrical first clutch element 11 as a centring portion. The first clutch element 11 and the hollow cylindrical wall 19 of the pot of the second clutch element 12 again form a clearance fit to minimize the influence on the maximum torque transmitted from the first clutch element 11 to the second clutch element 12 without slippage. As can be seen from the illustration in FIG. 4, the pot of the second clutch element 12 has a cross section that tapers towards the threaded spindle 7. In this way, centring of the two clutch elements 11, 12 with respect to each other is facilitated when the two clutch elements 11, 12 move apart once in the axial direction.

For the purposes of original disclosure, it should be noted that all of the features as they become apparent to a skilled person based on the present description, the drawings, and the claims, even if they have been specifically described only in connection with specific other features, can be combined both individually and in any combination with other features or groups of features disclosed here, insofar as this has not been expressly excluded or technical circumstances make such combinations impossible or pointless. A comprehensive, explicit presentation of all conceivable combinations of features is omitted here solely for the sake of the brevity and legibility of the description.

Although the invention has been presented and described in detail in the drawings and the foregoing description, this representation and description is made merely by way of example and is not intended to limit the scope of protection as defined by the claims. The invention is not limited to the embodiments shown.

Modifications of the disclosed embodiments will be obvious to the skilled person based on the drawings, the description, and the appended claims. In the claims, the word "has" does not exclude other elements or steps, and the indefinite article "a" or "an" does not exclude a plurality. The mere fact that certain features are claimed in different claims does not preclude their combination. The reference numbers in the claims are not intended to limit the scope of protection.

LIST OF REFERENCE NUMBERS

1 Telescopic rail
2 First rail element
3 Second rail element
4 Spindle drive
5 Electric motor
6 Clutch
7 Threaded spindle
8 Motor shaft
9 Axial direction
10 Radial direction
11 First clutch element
12 Second clutch element
13, 14 Assembly sleeve
15 First friction surface
16 Second friction surface
17 Centring bushing
18 Centring pin
19 Hollow cylindrical wall
20 Permanent magnet
21 Pot
22 Base
23 Surface of the magnet
24 Side wall of the pot

What is claimed is:

1. A linear guide system, comprising:
at least a first rail element and a second rail element, the first rail element and the second rail element being mounted linearly displaceable relative to each other in and counter to an extraction direction,
an electric motor,
an input shaft, the input shaft being operatively coupled to the electric motor such that the electric motor sets the input shaft in rotation during operation of the linear guide system,
a linear drive, the linear drive having an output shaft, and the linear drive being arranged such that a rotary movement of the output shaft effects a linear movement of the first and second rail elements relative to each other in or counter to the extraction direction, and
a clutch, the clutch connecting the input shaft and the output shaft to each other such that the clutch transmits a torque from the input shaft to the output shaft,
wherein the clutch is a magnetic clutch having:
a first clutch element, and
a second clutch element,
wherein the first clutch element is connected in a torque-resistant manner to the input shaft,
wherein the second clutch element is connected in a torque-resistant manner to the output shaft, and
wherein at least the first clutch element or the second clutch element comprises a permanent magnet arranged in a ferromagnetic pot, wherein the ferromagnetic pot has substantially cylindrical walls and a base, and
wherein the first clutch element and the second clutch element have a frictional fit provided by two frictional surfaces mechanically engaged with each other.

2. The linear guide system according to claim 1, the first clutch element having a first friction surface and the second clutch element having a second friction surface, the first friction surface being perpendicular to the input shaft and the second friction surface being perpendicular to the output shaft, and the first friction surface and the second friction surface being engaged with each other such that the torque is transmitted from the input shaft to the output shaft by a frictional fit between the first friction surface and the second friction surface.

3. A linear guide system, comprising:
- at least a first rail element and a second rail element, the first rail element and the second rail element being mounted linearly displaceable relative to each other in and counter to an extraction direction,
- an electric motor,
- an input shaft, the input shaft being operatively coupled to the electric motor such that the electric motor sets the input shaft in rotation during operation of the linear guide system,
- a linear drive, the linear drive having an output shaft, and the linear drive being arranged such that a rotary movement of the output shaft effects a linear movement of the first and second rail elements relative to each other in or counter to the extraction direction, and
- a clutch, the clutch connecting the input shaft and the output shaft to each other such that the clutch transmits a torque from the input shaft to the output shaft,
- wherein the clutch is a magnetic clutch having:
  - a first clutch element, and
  - a second clutch element,
- wherein the first clutch element is connected in a torque-resistant manner to the input shaft,
- wherein the second clutch element is connected in a torque-resistant manner to the output shaft, and
- wherein only the first clutch element or only the second clutch element comprises a permanent magnet arranged in a ferromagnetic pot, wherein the ferromagnetic pot has substantially cylindrical walls and a base, the permanent magnet being arranged such that portions of the permanent magnet are enclosed in ferromagnetic material of the first clutch element, and portions of the permanent magnet are enclosed in ferromagnetic material of the second clutch element.

4. The linear guide system according to claim 1, the first clutch element having a first centering portion and the second clutch element having a second centering portion, the first and second centering portions being designed complementary to each other, and the first and second centering portions being arranged such that they guide the first clutch element and the second clutch element in the radial direction relative to each other such that the first clutch element and the second clutch element have a common axis of rotation.

5. The linear guide system according to claim 4, the first and second centering portions being arranged to enable rotation of the first clutch element at a first angular speed and rotation of the second clutch element at a second angular speed, the first angular speed being different from the second angular speed.

6. The linear guide system according to claim 4, one of the first and second centering portions forming a centering bushing and the other of the first and second centering portions forming a centering pin, at least portions of the centering pin extending into the centering bushing.

7. The linear guide system according to claim 6, the centering pin and the centering bushing forming a clearance fit in the radial direction.

8. The linear guide system according to claim 6, at least the centering bushing or the centering pin having a cross section, at least portions of which taper.

9. The linear guide system according to claim 1, at least the first clutch element or the second clutch element being clamped onto the input shaft or the output shaft such that a torque through a frictional joint between the respective clutch element and the respective shaft is transmittable, a torque-resistant connection being formed between the respective clutch element and the respective shaft.

10. A linear guide system, comprising:
- at least a first rail element and a second rail element, the first rail element and the second rail element being mounted linearly displaceable relative to each other in and counter to an extraction direction,
- an electric motor,
- an input shaft, the input shaft being operatively coupled to the electric motor such that the electric motor sets the input shaft in rotation during operation of the linear guide system,
- a linear drive, the linear drive having an output shaft, and the linear drive being arranged such that a rotary movement of the output shaft effects a linear movement of the first and second rail elements relative to each other in or counter to the extraction direction, and
- a clutch, the clutch connecting the input shaft and the output shaft to each other such that the clutch transmits a torque from the input shaft to the output shaft,
- wherein the clutch is a magnetic clutch having:
  - a first clutch element, and
  - a second clutch element,
- wherein the first clutch element is connected in a torque-resistant manner to the input shaft,
- wherein the second clutch element is connected in a torque-resistant manner to the output shaft,
- wherein at least the first clutch element or the second clutch element comprises a permanent magnet arranged in a ferromagnetic pot, wherein the ferromagnetic pot has substantially cylindrical walls and a base, and
- wherein at least the first clutch element or the second clutch element has an assembly sleeve extending in the axial direction, the input shaft or the output shaft extending into the assembly sleeve and the input shaft or the output shaft being connected to the assembly sleeve with at least a frictional fit, a positive fit, or a bonded fit.

11. The linear guide system according to claim 10, the input shaft or the output shaft in the assembled state comprising an oversize in the radial direction relative to the respective assembly sleeve.

* * * * *